United States Patent Office 3,592,880
Patented July 13, 1971

3,592,880
PROCESS FOR PREPARING POLYOLEFINS
Bernd Diedrich and Karl Diether Kreil, Frankfurt am Main, Germany, assignors to Farbwerke Hoechst Aktiengesellschaft vormals Meister Lucius & Bruning, Frankfurt am Main, Germany
No Drawing. Filed Dec. 27, 1967, Ser. No. 693,721
Claims priority, application Germany, Jan. 28, 1967, F 51,374
Int. Cl. C08f 15/00
U.S. Cl. 260—878   7 Claims

ABSTRACT OF THE DISCLOSURE

Polyethylene or copolymers of ethylene and higher $\alpha$-olefins having a high stress cracking resistance, are prepared by a process which comprises two reaction steps of a suspension or gaseous phase polymerization, in which a mixed catalyst of a trivalent chlorine-containing titanium compound and an aluminium trialkyl or a reaction product of aluminium trialkyls or alkylhydrides with diolefins is used, the hydrogen content of the gas zone being low in one step and high in the other step.

---

The present invention provides polyolefins having a high stress cracking resistance, and a process for preparing them.

The production of bottles, cables, pipes and the like by extrusion processing requires polyethylenes or copolymers of ethylene having a broad molecular weight distribution, since polyolefins having a narrow molecular weight distribution, show irregular surfaces on extruded articles (melt fracture) at a high throughput of the extruder. The material to be extruded into bottles, pipes and cable sheathings, must, furthermore, possess a sufficient stress cracking resistance.

It is known that the stress cracking resistance of a polyethylene can be improved by increasing its medium molecular weight and/or reducing its density. To this effect, however, an increase in the medium molecular weight is suitable to only a limited extent, since the flow properties of a polymer are reduced when the molecular weight is raised, and therefore the throughput of the extruding machines is also reduced. When the density is decreased by a copolymerization of ethylene with $\alpha$-olefins, the stress cracking resistance is improved but the stiffness, the ultimate tensile strength, the surface hardness and the softening point are reduced.

It is therefore necessary to find a process for preparing a polyethylene or a copolymer of ethylene which has a high density and a high stress cracking resistance and shows an unobjectionable surface on an article when extruded at a high throughput of the extruder. It is, furthermore, known that polymers having interesting application properties can be prepared by carrying out the polymerization in several steps under different polymerization conditions.

British Pat. No. 978,893 discloses a process for preparing polymers having a high impact strength and a high melting temperature, by polymerizing olefins having from 2 to 18 carbon atoms, according to the Ziegler low-pressure-polymerization process in two steps. In the first step, a polyolefin having a rigid nature is prepared and in the second step, a polymer having a predominantly soft nature is obtained.

The second process step is preferably carried out without controlling the molecular weight. As catalysts suitable for the process, there may be mentioned salts of elements of groups 4 to 6 of the Periodic Table and, as activators, organometallic compounds of the main groups 1 to 3 of the Periodic Table.

According to British Pat. No. 1,057,728, a continuous polymerization of ethylene, propylene or butene-(1) is carried out in the presence of a catalyst system consisting of an organic compound of a metal of groups 1 to 3 of the Periodic Table and a compound of a transition metal of groups 4 to 6 or 8 of the Periodic Table in an apparatus comprising at least two reaction zones.

In the separate zones, polymers having different molecular weights, are prepared by carrying out the polymerization or copolymerization under different reaction conditions. The differing molecular weights are obtained by using different amounts of hydrogen and/or different catalyst concentrations and/or different temperatures, at least two reaction conditions having to be changed.

The polymer mixtures prepared by this polymerization in several zones are distinguished by an improved processability. The same effect cannot be produced by subsequently mixing polymers having widely differing viscosities. The process, however, has the great drawback that several reaction conditions have to be changed during the polymerization.

We have now found that it is possible, by means of a technically simple two-step polymerization process, to prepare polyolefins which have a considerably improved stress cracking resistance and simultaneously permit a high throughput when processed into shaped articles having a good surface quality.

This invention relates to a proces for polymerizing ethylene or mixtures of ethylene with up to 10% by weight of higher $\alpha$-olefins containing from 3 to 15 carbon atoms, in two steps in suspension or in the gaseous phase at temperatures in the range of from 50 to 120° C., preferably from 70 to 90° C. and under pressures less than 10 atmosphere gage, preferably in the range of from 2 to 6 atmospheres gage, in the presence of a mixed catalyst consisting of a trivalent titanuim compound containing chlorine, and an organo-aluminium compound, which process comprises carrying out the polymerization in the presence of a mixed catalyst consisting of (1) from 0.05 to 0.3 millimol per liter of dispersing agent or per 0.5 liter of reactor volume, of a trivalent titanium compound containing chlorine, and
(2) from 0.1 to 3.0 millimols of aluminium per liter of dispersing agent or reactor volume, of an organo-aluminium compound, this organo-aluminium compound being (a) aluminium trialkyls of the formula AlR₃, in which R represents a hydrocarbon radical having from 4 to 40 carbon atoms, preferably from 4 to 12 carbon atoms, or (b) reaction products obtained from aluminium trialkyls or aluminium alkyl-hydrides and diolefins containing from 4 to 20 carbon atoms, such as aluminium isoprenyl, and preparing, in the one step, from 5 to 30% by weight of the total polymer at a hydrogen content in the gas zone ranging from 0 to 10% by volume, and, in the other step, from 70 to 95% by weight of the total polymer at a hydrogen content in the gas zone ranging from 20 to 80% by volume.

For preparing the polymers, the following embodiments are preferred:

(a) In the one step, mixtures of ethylene with up to 10% by weight of higher α-olefins having from 3 to 15 carbon atoms, are polymerized to yield from 5 to 30% by weight, calculated on the total polymer, of the copolymer of ethylene and α-olefins at a hydrogen content in the gas zone ranging from 0 to 10% by volume, and in the other step, ethylene alone is polymerized at a hydrogen content in the gas zone ranging from 20 to 80% by volume.

(b) In the first step, mixtures of ethylene with up to 10% by weight of higher α-olefins containing from 3 to 15 carbon atoms, are polymerized to yield from 5 to 30% by weight, calculated on the total polymer, of the copolymer of ethylene and α-olefins at a hydrogen content in the gas zone ranging from 0 to 10% by volume, and in the second step, the polymerization is carried out with a mixture of ethylene and α-olefins, the α-olefin content being less than in the first step, at a hydrogen content in the gas zone ranging from 20 to 80% by volume.

The polymerization is carried out in inert dispersing agents, such as aliphatic or cycloaliphatic hydrocarbons or diesel oil, but also in the gaseous phase. The reaction temperatures are in the range of from 50 to 120° C., preferably from 70 to 90° C. The titanium component used is a trivalent titanium compound, such as titanium trichloride or titanium alkoxychloride, which is prepared by reducing titanium tetrachloride or, preferably chloro-alkoxy-titanate of the formula $Ti(OR)_{4-n}Cl_n$, in which $n$ is an integer of from 1 to 4 and R represents a hydrocarbon radical having from 2 to 8 carbon atoms, by means of alkyl-aluminium sesquichloride and/or dialkyl-aluminium monochloride and/or aluminium isoprenyl in an inert dispersing agent at temperatures ranging from −60° C. to +70° C., preferably from −30° C. to 0° C., and then, if desired, subjecting it to a thermal treatment at a temperature in the range of from 60 to 150° C. and subsequently washing it with an inert dispersing agent.

In one of the steps, the polymerization is effected at a hydrogen content in the gas zone ranging from 0 to 10% by volume, to yield polymers having a reduced specific viscosity in the range of from 30 to 5 (measured in a 0.1%-decahydronaphthalene solution at 135° C.). The amount of the polymer proportion prepared in this step is, advantageously, in the range of from 5 to 30% by weight, calculated on the polymer. In the other step, the polymerization is effected at a hydrogen content in the gas zone ranging from 20 to 80% by volume. It has been established that, under these conditions, polyethylenes or copolymers of ethylene and α-olefins having a reduced specific viscosity in the range of from 4.6 to 1.5, are obtained.

According to the two step-polymerization process of the invention, a polymer having a reduced specific viscosity in the range of from 5 to 30, is mixed in situ with a polymer having a reduced specific viscosity in the range of from 1.5 to 4.6 to yield a homogeneous polymer. Therefore, the total polymer has an extremely broad molecular weight distribution.

Compared with shaped articles made from copolymers of ethylene and α-olefins, in which the hydrogen content in the gaseous phase has not been charged during the polymerization, shaped articles made from polymers of the invention, having the same density and the same reduced specific viscosity, show improved surfaces in spite of an increased throughput of the extruder.

The process of the invention, moreover, provides polymers having an extremely broad molecular weight distribution, in which the higher molecular weight polymer chains also have a higher degree of branching when, in the one step in which the hydrogen content in the gaseous phase ranges from 0 to 10% by volume, a mixture of α-olefins and ethylene is polymerized and, in the other step in which the hydrogen content is in the range of from 20 to 80% by volume, either ethylene alone or a mixture of ethylene and α-olefins having a lower α-olefin content, is polymerized.

Owing to their special structure (extremely broad molecular weight distribution and higher degree of branching of the high molecular weight proportion), the polymers of the invention are especially suitable for producing bottles, pipes, cables and sheets or films having a high stress cracking resistance.

The stress cracking resistance or the susceptibility to stress cracking is measured according to ASTMD 1693–59T (Bell-test).

Having a density of 0.950 gram·centimeter⁻³ and a reduced specific viscosity of 2.7, shaped articles made from copolymers of ethylene and α-olefins having a statistical incorporation of the comonomer (prepared by a uniform α-olefin feed during the whole polymerization), show values of 180 hours in the Bell-test.

In contrast thereto, shaped articles made from polymers in which the α-olefin is predominantly incorporated into the high molecular weight proportion, show values of more than 500 hours in the Bell-test, although their density and viscosity are the same as those of the above-mentioned products; Bell-test values of 180 hours are already achieved by shaped articles having a density of 0.956 gram·centimeter⁻³. Having the same stress cracking resistance as the above-mentioned articles, the shaped articles produced according to the invention show a higher density. In comparison with the copolymers of ethylene and α-olefins having a statistical incorporation of the comonomer, the advantages of the polymers of the invention are an improved stiffness, a higher ultimate tensile strength, a better surface hardness and a higher softening point.

The advantages of the process of the invention compared with those of the known two-step polymerization processes (British Pats. Nos. 978,893 and 1,057,728) consist in carrying out the present process in an especially simple technical manner. When aluminium trialkyls of the formula AlR₃ in which R represents a hydrocarbon radical containing from 4 to 40 carbon atoms, or preferably reaction products of aluminum trialkyls or aluminium alkyl-hydrides with diolefins containing from 4 to 20 carbon atoms, such as aluminium isoprenyl, are used, high polymer yields exceeding 1 kilogram of polymer per 1 millimol of titanium compound are obtained with the catalyst concentration and under the reaction conditions mentioned above. The ash content is so low (0.03% by weight) that the polymers can be processed without eliminating the catalyst in advance.

When the catalyst- and activator combination of the invention is used within the concentration range mentioned, it is moreover possible to carry out a two-step polymerization process wherein polymer proportions having widely differing viscosities can be prepared by merely changing the hydrogen content in the gas zone. In contradistinction thereto, according to Belgian Pat. No. 655,984, several reaction conditions, such as hydrogen concentration, catalyst concentration and polymerization temperature, have to be changed to obtain—in both steps—polymers having very different viscosities.

Therefore, the process of the invention provides, in a technically simple manner, polymers in which four structural parameters (molecular weight, molecular weight distribution, density and distribution of the comonomer) can be varied as desired so that the properties desired for the processing or the application of the products, can be controlled.

The process of the invention can be carried out continuously or discontinuously. The continuous method is carried out in two reactors arranged in series, by operating in the various polymerization vessels according to the conditions mentioned for the two steps.

The experiments were carried out in a stirring vessel having a capacity of 150 liters.

The dispersing agent used was a hydrocarbon cut boiling in the range of from 130 to 170° C.

When the polymerization is terminated the polymer suspension is filtered under nitrogen over a pressure filter; the polymer is dried by passing nitrogen heated to 120° C., over it. The reduced specific viscosity values were measured in a 0.1%-decahydronaphthalene solution at 135° C.

The following examples serve to illustrate the present invention, but they are not intended to limit it thereto.

EXAMPLE 1

(a) Preparation of the titanium catalyst.—A four-necked flask having a capacity of 500 milliliters was filled, under exclusion of air and moisture, with 100 milliliters of an olefin-free diesel oil cut boiling in the range of from 130 to 170° C., and 59.4 grams (240 millimols) of ethylaluminium sesquichloride. At 0° C. and within 120 minutes, 37.6 grams (160 millimols) of dichlorotitanic acid diisopropyl ester in 120 milliliters of cyclohexane were added thereto dropwise while stirring. A fine brown precipitate separated. To allow for an after-reaction, the batch was maintained for 4 hours at 0° C. while stirring. Subsequently, the mother liquor was decanted and the titanium residue was washed four times, each time with 200 milliliters of the above-mentioned diesel oil cut.

(b) Preparation of a copolymer of ethylene and butene-(1) having a density of 0.957 gram·centimeter$^{-3}$ (two-step polymerization).—100 liters of diesel oil boiling in the range of from 130 to 170° C., were introduced into a vessel having a capacity of 150 liters, and the air was evacuated by washing with pure nitrogen. The contents of the vessel were heated to 85° C. and saturated with ethylene.

After 50 milliliters of aluminium isoprenyl (prepared according to Belgian Pat. No. 601,855) and 20 millimols of a titanium catalyst (prepared as disclosed under 1(a) had been added thereto, 8 kilograms of ethylene, 0.13 kilogram of butene-(1) and such an amount of hydrogen were introduced, at 85° C. within 90 minutes, that the hydrogen content in the gaseous phase was 2% by volume. A polymer sample showed a reduced specific viscosity of 9.3.

At the same temperature and within 6 hours, 32 kilograms of ethylene and such an amount of hydrogen were then introduced into the batch that the hydrogen content in the gaseous phase amounted to 45% by volume. During the polymerization the maximum pressure in the vessel was 6 atmospheres gage.

There were obtained 40 kilograms of a copolymer having a reduced specific viscosity of 2.9 (measured in a 0.1%-decahydronaphthalene solution) and a density of 0.957 gram·centimeter$^{-3}$.

Comparative Example 1 (single-step polymerization)

In a comparative test, a copolymer having a density of 0.957 gram·centimeter$^{-3}$, was prepared in a single-step polymerization by continuously adding butene-(1).

In a vessel having a capacity of 100 liters, 100 liters of diesel oil having a boiling range of from 130 to 170° C., were washed with nitrogen. The contents of the vessel were heated to 85° C. and saturated with ethylene.

After 50 milliliters of aluminium isoprenyl and 20 millimols of a titanium catalyst prepared as disclosed under 1(a) had been added thereto, ethylene, 0.2% by weight of butene-(1) and such an amount of hydrogen were introduced into the batch at 85° C. that the hydrogen content in the gaseous phase was 35% by volume.

Under these conditions, the polymerization was carried out for 8 hours under a pressure of 6 atmospheres gage. There were obtained 44 kilograms of a copolymer having a reduced specific viscosity of 2.9 (measured in a 0.1%-decahydronaphthalene solution) and a density of 0.957 gram·centimeter$^{-3}$.

Comparative Example 2
(single-step polymerization)

Under the conditions disclosed in comparative Example 1, 40 kilograms of ethylene were polymerized with 0.13 kilogram of butene-(1) (=0.33% by weight) to yield a copolymer having a reduced specific viscosity of 2.9 and a density of 0.953 gram·centimeter$^{-3}$.

The properties of the copolymers are compared with each other in Table 1.

EXAMPLE 2

Preparation of a copolymer of ethylene and butene-(1) having a density of 0.948 gram·centimeter$^{-3}$ (two-step polymerization).

100 liters of diesel oil having a boiling range of from 130 to 170° were introduced into a vessel having a capacity of 150 liters; air was evacuated by washing it with pure nitrogen. The contents of the vessel were heated to 85° C., and saturated with ethylene. After 50 milliliters of aluminum isoprenyl and 20 millimols of a titanium catalyst prepared as disclosed under 1(a) had been added thereto, 6 kilograms of ethylene, 0.52 kilogram of butene-(1) and such an amount of hydrogen were introduced, at 85° C. and within 60 minutes, that the hydrogen content in the gaseous phase was 0.2% by volume. A polymer sample showed a reduced specific viscosity of 23.6.

At the same temperature and within 6 hours, 36 kilograms of ethylene and such an amount of hydrogen were then introduced into the batch that the hydrogen content in the gaseous phase amounted to 50% by volume. During the polymerization, the maximum pressure in the vessel was 6 atmospheres gage. There were obtained 42 kilograms of a copolymer having a reduced specific viscosity of 2.8 and a density of 0.948 gram·centimeter$^{-3}$.

Comparative Example 3
(single-step polymerization)

In a comparative test, a copolymer having a density of 0.948 gram·centimeter$^{-3}$, was prepared in a single-step polymerization process by continuously adding butene-(1).

In a vessel having a capacity of 150 liters, 100 liters of diesel oil having a boiling range of from 130 to 170° C., were washed with nitrogen. The contents of the vessel were heated to 85° C. and saturated with ethylene.

After 50 milliliters of aluminium isoprenyl and 20 millimols of a titanium catalyst prepared as disclosed under 1(a) had been added thereto, ethylene, butene-(1) (0.9% by weight, calculated on the ethylene used) and such an amount of hydrogen were introduced at 85° C. that the hydrogen content in the gaseous phase was 36% by volume. The polymerization was carried out within 8 hours under a pressure of 6 atmospheres gage. There were obtained 44 kilograms of a copolymer having a reduced specific viscosity of 2.8 and a density of 0.948 gram·centimeter$^{-3}$. The properties of the copolymers are compared with each other in Table 1.

TABLE 1

| Copolymer prepared according to— | Density, gram-centimeter⁻³ (buoyancy method) | Reduced specific viscosity in 0.1%-decahydronaphthalene at 135° C. | Ball indentation hardness (10 seconds) VDE 0302 |
| --- | --- | --- | --- |
| Example 1 | 0-957 | 2-9 | 580 |
| Comparative test 1 | 0-957 | 2-9 | 580 |
| Comparative test 2 | 0-953 | 2-9 | 530 |
| Example 2 | 0-948 | 2-8 | 480 |
| Comparative test 3 | 0-948 | 2-8 | 480 |

| | Crystallite melt point (polarization microscope) °C. | Stress cracking resistance, Bell test (hours) ASTMD 1693-59T | Surfaces of bottles (produced under the same conditions) | Relative throughput in extrusion processing under the same conditions |
| --- | --- | --- | --- | --- |
| Example 1 | 130-132 | 220 | Smooth | 1 |
| Comparative test 1 | 130-132 | 25 | Rough; light melt fracture. | 0-8 |
| Comparative test 2 | 128-131 | 60 | ....do | 0-83 |
| Example 2 | 126-129 | >500 | Smooth | 1-3 |
| Comparative test 3 | 126-129 | 120 | Rough; melt fracture. | 0-82 |

What is claimed is:

1. A process comprising polymerizing in two steps in a gas zone ethylene or mixtures of ethylene with up to 10% by weight of a higher α-olefin containing from 3 to 15 carbon atoms, in suspension in an inert dispersing agent or in the gaseous phase, at temperatures in the range of from 50 to 120° C., under a pressure less than 10 atmospheres gauge and in the presence of a mixed catalyst consisting of (1) from 0.05 to 0.3 millimol per liter of dispersing agent or per 0.5 liter of reactor volume, of a trivalent titanium compound containing chlorine, and (2) from 0.1 to 3.0 millimols of aluminum per liter of dispersing agent or reactor volume, of an organoaluminum compound selected from the group consisting of (a) aluminum trialkyls of the formula AlR3, in which R represents a hydrocarbon radical containing from 4 to 40 carbon atoms, or (b) a reaction product of an aluminum trialkyl or an aluminum alkyl-hydride and a diolefin containing from 4 to 20 carbon atoms, the polymerization is one step being from 5 to 30% by weight of the total polymer in the presence of a hydrogen content in the gas zone of from 0 to 10% by volume, and the polymerization in the other step being from 70 to 95% by weight of the total polymer in the presence of a hydrogen content in the gas zone of from 20 to 80% by volume.

2. The process of claim 1, wherein, in one step, mixtures of ethylene with up to 10% by weight of a higher α-olefin containing from 3 to 15 carbon atoms, are polymerized to yield from 5 to 30% by weight, calculated on the total polymer, of a copolymer of ethylene and higher α-olefin in the presence of a hydrogen content in the gas zone of from 0 to 10% by volume and, in the other step, ethylene alone is polymerized in the presence of a hydrogen content in the gas zone ranging from 20 to 80% by volume.

3. The process of claim 1, wherein, in a first step, mixtures of ethylene with up to 10% by weight of a higher α-olefin containing from 3 to 15 carbon atoms, are polymerized to yield from 5 to 30% by weight, calculated on the total polymer, of a copolymer of ethylene and higher α-olefins in the presence of a hydrogen content in the gas zone of from 0 to 10% by volume, and in the second step, the polymerization is carried out with a mixture of ethylene and a higher α-olefin, having a lower content of higher α-olefin than in the first step, in the presence of a hydrogen content in the gas zone of from 20 to 80% by volume.

4. The process of claim 1, wherein component (1) is prepared by reducing titanium tetrachloride or, chloroalkoxytitanate of the formula $Ti(OR)_{4-n}Cl_n$, in which $n$ is an integer of from 1 to 4 and R represents a hydrocarbon radical having from 2 to 8 carbon atoms, by means of alkylaluminum sesquichloride, dialkyl-aluminum monochloride, aluminum isoprenyl or mixtures thereof at temperatures in the range of −60° C. to +70° C.

5. The process of claim 1, wherein the polymerization is carried out at a temperature in the range of from 70 to 90° C.

6. The process of claim 1, wherein the polymerization is carried out under a pressure in the range of from 2 to 6 atmospheres gauge.

7. The process of claim 1, wherein aluminum trialkyls of the formula $AlR_3$ are used, in which formula R represents a hydrocarbon radical having from 4 to 12 carbon atoms.

References Cited

UNITED STATES PATENTS

| 3,051,690 | 8/1962 | Vandenberg | 260—88.2 |
| 3,301,921 | 1/1967 | Short | 260—878 |
| 3,341,503 | 9/1967 | Paige et al. | 260—80.78 |
| 3,345,431 | 10/1967 | Harban | 260—878 |
| 3,378,607 | 4/1968 | Jones et al. | 260—878 |
| 3,392,213 | 7/1968 | Berger | 260—878 |

FOREIGN PATENTS

| 978,893 | 12/1964 | Great Britain | 260—878 |

JOSEPH L. SCHOFER, Primary Examiner

S. M. LEVIN, Assistant Examiner

U.S. Cl. X.R.

260—88.2, 93.7, 94.9